(12) United States Patent
Chen et al.

(10) Patent No.: US 7,322,378 B2
(45) Date of Patent: Jan. 29, 2008

(54) SEMICONDUCTOR APPARATUSES AND PIPE SUPPORTS THEREOF

(75) Inventors: Yan-Shou Chen, Taipei (TW); Yi-Chun Su, Hsinchu (TW); Dennis Lai, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 277 days.

(21) Appl. No.: 10/974,710

(22) Filed: Oct. 28, 2004

(65) Prior Publication Data

US 2006/0108791 A1 May 25, 2006

(51) Int. Cl.
*F16L 19/00* (2006.01)
(52) U.S. Cl. .................. 138/112; 138/114; 138/148; 285/123.3
(58) Field of Classification Search ......... 138/112, 138/114, 148; 285/123.3
See application file for complete search history.

(56) References Cited

U.S. PATENT DOCUMENTS

| | | | | |
|---|---|---|---|---|
| 1,389,768 | A | * | 9/1921 | McFarland ............... 285/123.3 |
| 1,798,295 | A | * | 3/1931 | Yerkes et al. ............... 166/191 |
| 1,825,774 | A | * | 10/1931 | Boynton ................. 285/123.12 |
| 1,992,200 | A | * | 2/1935 | Ford ........................ 285/123.3 |
| 3,424,477 | A | * | 1/1969 | Putch et al. .................. 285/18 |
| 3,536,584 | A | * | 10/1970 | Long et al. .................. 376/463 |
| 4,573,400 | A | * | 3/1986 | Foy ............................. 454/47 |
| 4,940,087 | A | * | 7/1990 | Lien et al. .................. 166/88.1 |
| 4,940,098 | A | * | 7/1990 | Moss .......................... 175/320 |
| 5,044,432 | A | * | 9/1991 | Cunningham et al. ...... 166/319 |
| 5,209,521 | A | * | 5/1993 | Osborne ........................ 285/3 |
| 6,039,066 | A | * | 3/2000 | Selby ......................... 137/312 |
| 6,305,407 | B1 | * | 10/2001 | Selby ......................... 137/312 |
| 6,848,720 | B2 | * | 2/2005 | Carns et al. ........... 285/123.15 |
| 2006/0000515 | A1 | * | 1/2006 | Huffman ..................... 138/114 |
| 2006/0231150 | A1 | * | 10/2006 | Jamison ..................... 138/114 |

* cited by examiner

*Primary Examiner*—James Hook
(74) *Attorney, Agent, or Firm*—Birch, Stewart, Kolasch & Birch, LLP

(57) ABSTRACT

A semiconductor apparatus with a modified pipe support. The apparatus comprises an outer pipe, an inner pipe, and a pipe support. The support comprises a seat and a support ring. The seat comprises a tubular portion for supporting an outer pipe at a top end. The support ring is detachably disposed within the tubular portion and comprises am annular surface and an inner bore surface, wherein the annular surface is inclined to the inner bore surface by an acute angle.

20 Claims, 5 Drawing Sheets

SEMICONDUCTOR APPARATUSES AND PIPE SUPPORTS THEREOF

BACKGROUND

The invention relates to high-temperature pipe supports, and in particular to high-temperature pipe supports for semiconductor apparatuses.

FIG. 1A is a partial cross section of a conventional chemical vapor deposition (CVD) apparatus. In FIG. 1A, the conventional CVD apparatus 10 comprises a seat 12, support ring 14, outer pipe 16, and inner pipe 18. The support ring 14 is disposed on the inner bore of the seat 12 near the bottom thereof. The inner pipe 18 and the outer pipe 16 are separately disposed on the seat 12 and support ring 14. The inner pipe 18 defines a sealed reaction chamber 182. During a CVD process, wafers are transferred into the reaction chamber 182 via a robot from the bottom entrance 184. The entrance 184 is closed and sealed, forming a vacuum in the reaction chamber 182 prior to CVD processes.

Due to the high operation temperature (above 700° C.) of CVD processes, the conventional inner pipe 18 and outer pipe 16 is quartz. The seat 12 and support ring 14 are stainless steel. The seat 12 is water-cooled from the outer bore and the sidewall adjacent to the gas outlet 122. After a number of CVD processes, silicide will coat the inner surfaces of the seat 12 and gas outlet 122. The coated silicide peels easily, however, producing particles P in the buffer space between the inner and outer pipes 16 and 18.

FIG. 1B is an enlarged view of area a in FIG. 1A. In order to easily position the inner pipe 18 during assembly, the conventional support ring 14 comprises a lead angle 144 around the inner upper edge such that particles P easily accumulate in the recess between the inner pipe 18 and the support ring 14. Particles P may be sucked into the reaction chamber 182 through the gap between the inner pipe 18 and the support ring 14 when the vacuum of the reaction chamber 182 is breaking and the entrance 184 is opened. Thus the silicide particles can be a principle reaction chamber contaminant source in a conventional CVD apparatus.

SUMMARY

Pipe supports for semiconductor apparatuses are provided. An exemplary embodiment of a pipe support comprises a seat and a support ring. The seat comprises a tubular portion for supporting an outer pipe at a top end thereof. The support ring with a flange and an end surface is detachably disposed within the tubular portion. The flange is disposed on an inner bore of the support ring, for supporting an inner pipe. The end surface is outwardly inclined from the inner bore to an outer bore of the support ring.

Semiconductor apparatuses are provided. An exemplary embodiment of a semiconductor apparatus comprises an outer pipe, an inner pipe, and a pipe support. The pipe support comprises a seat and a support ring. The seat further comprises a tubular portion for supporting an outer pipe at a top end thereof. The support ring with an end surface and an inner bore is detachably disposed within the tubular portion. Moreover, the end surface is inclined to the inner bore by an acute angle.

In some embodiments of the invention, the flange comprises a top surface perpendicular to the inner bore of the support ring. The end surface is inclined to the inner bore by an angle between 25° and 85°. The intersection of the end surface and the inner bore is higher than the intersection of the end surface and the outer bore of the support ring. Moreover, the end surface is an annular flat surface, annular concave surface, or annular convex surface.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1A:
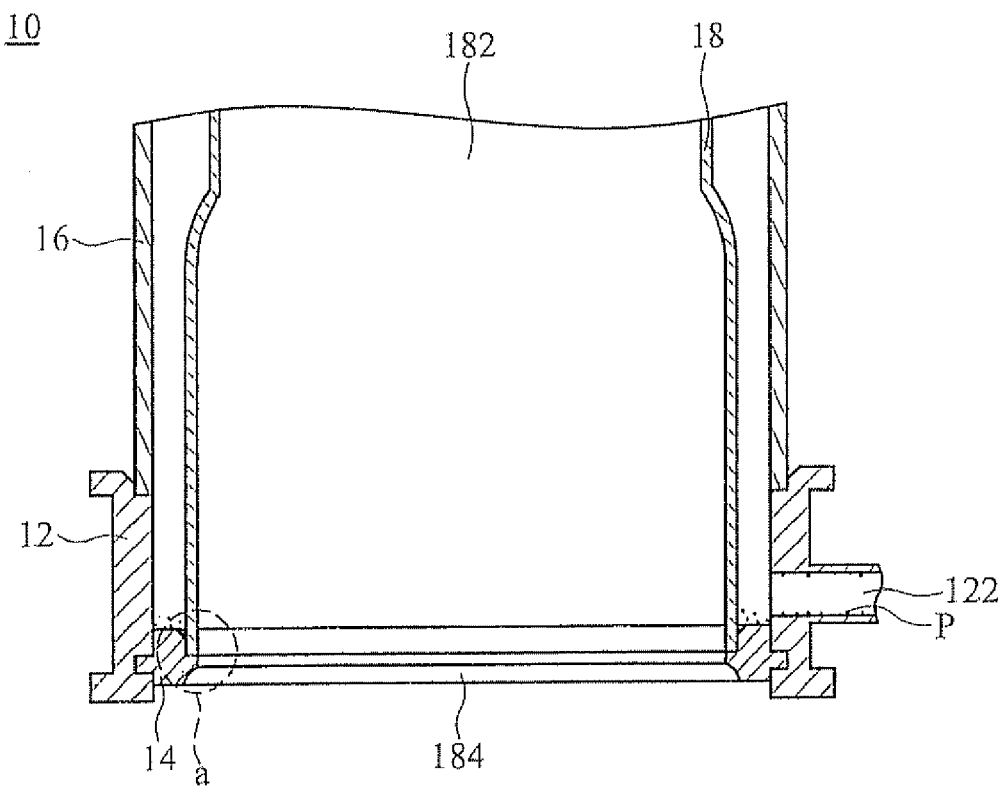
FIG. 1A is a partial cross section of a conventional CVD apparatus.
Figure 1B:
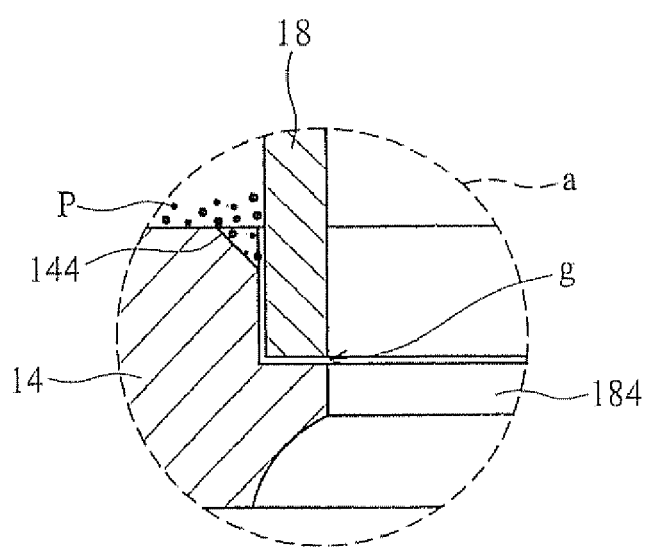
FIG. 1B is an enlarged view of area a in FIG. 1A.
Figure 2:
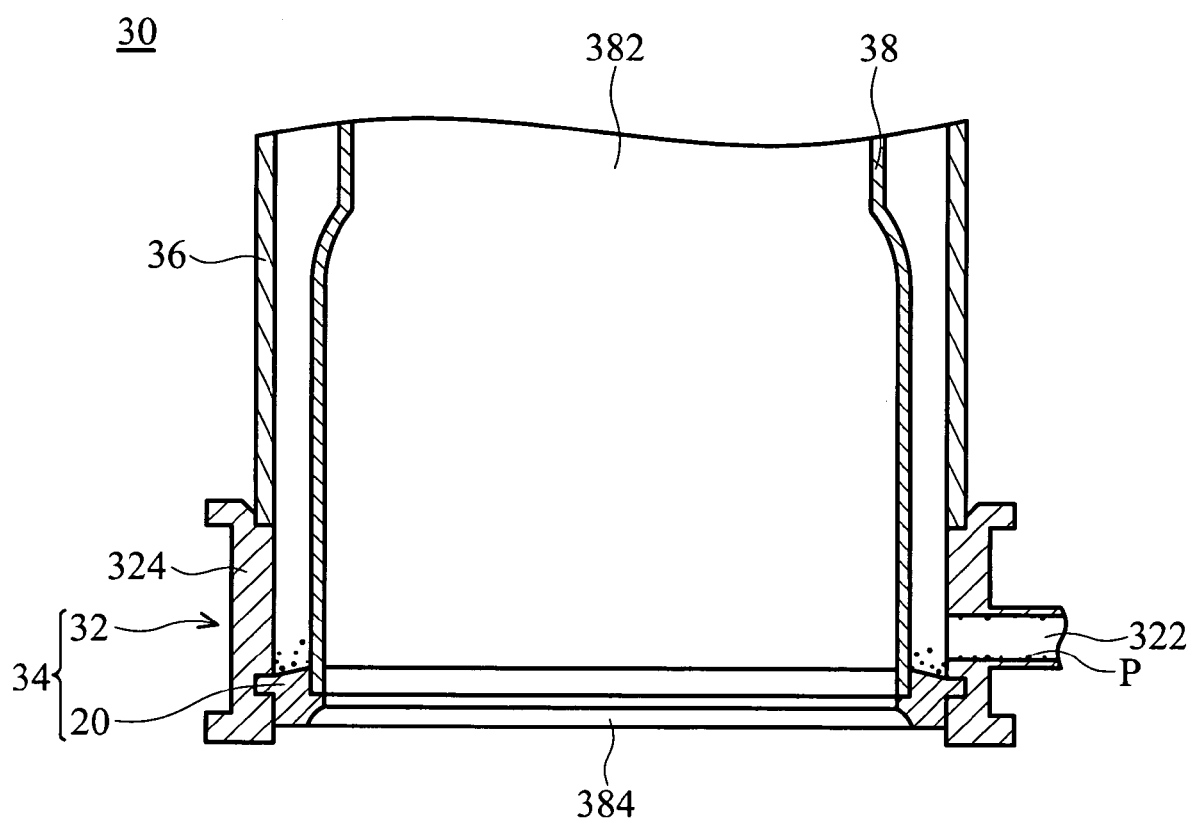
FIG. 2 is a partial cross section of an embodiment of a CVD apparatus of the present invention.

A pipe support for semiconductor apparatus will now be described here in greater detail. FIG. 2 is a partial cross section of an embodiment of a CVD apparatus of the present invention. In FIG. 2, the CVD apparatus 30 comprises an inner pipe 38, outer pipe 36, and a pipe support 34. The inner pipe 38 and outer pipe 36 are quartz. The pipe support 34 comprises a seat 32 and a support ring 20. The seat 32 further comprises a tubular portion 324 and a gas outlet 322 connected thereto. The outer pipe 36 is disposed at a top end of the tubular portion 324. The support ring 20 is detachably disposed within the tubular portion adjacent to the bottom thereof. The inner pipe 38 is disposed on the support ring 20 and defines a sealed reaction chamber 382. During a CVD process, wafers are transferred into the reaction chamber 382 via a robot from the bottom entrance 384. The entrance 384 is closed and sealed, forming a vacuum in the reaction chamber 382 prior to CVD processes.

Figure 3A:
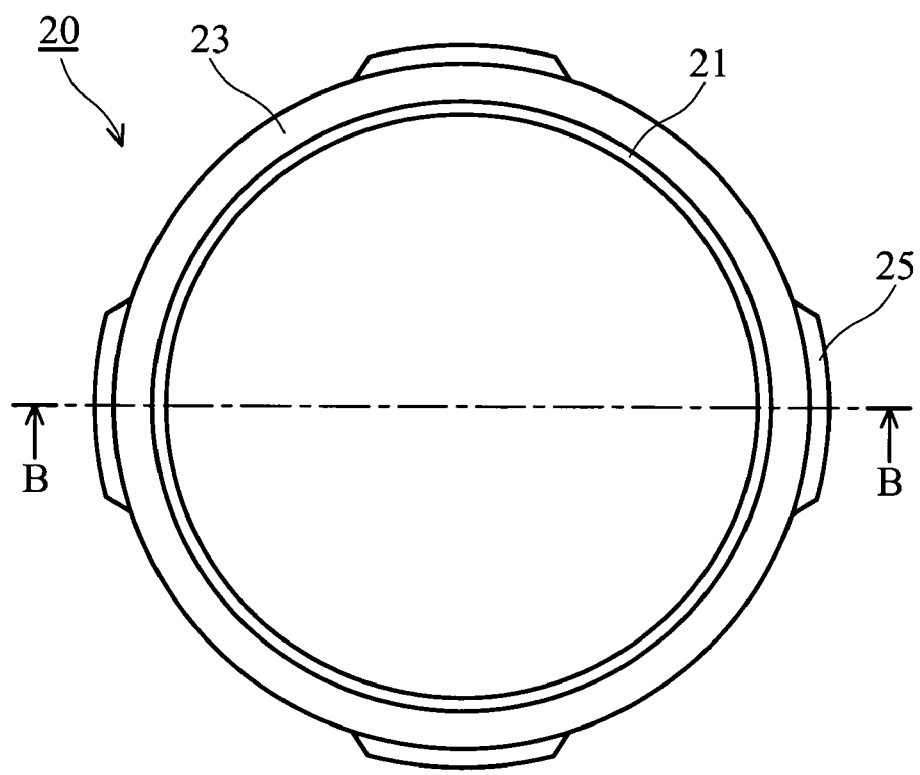
FIG. 3A is a schematic top view of the support ring in FIG. 2.
Figure 3B:
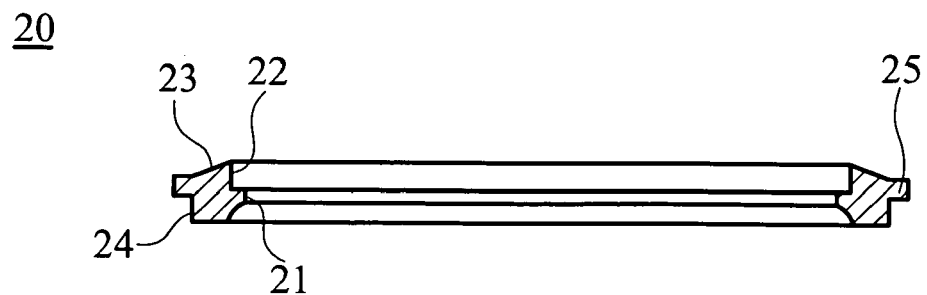
FIG. 3B is a schematic side view of the support ring in FIG. 2.

FIGS. 3A and 3B are schematic top and side views of the support ring in FIG. 2. In FIGS. 3A and 3B, the support ring 20 comprises a plurality of lugs 25, a flange 21, and an end surface 23. The lugs 25 engage the assembly grooves of the seat 32, securing the support ring 20 to the inner bore of the tubular portion 324 of the seat 32. The flange 21 is located on the inner bore 22 of the support ring 20, for supporting the inner pipe 38. The end surface 23 is outwardly inclined from the inner bore 22 to the outer bore 24 of the support ring 20.

Figure 4A:
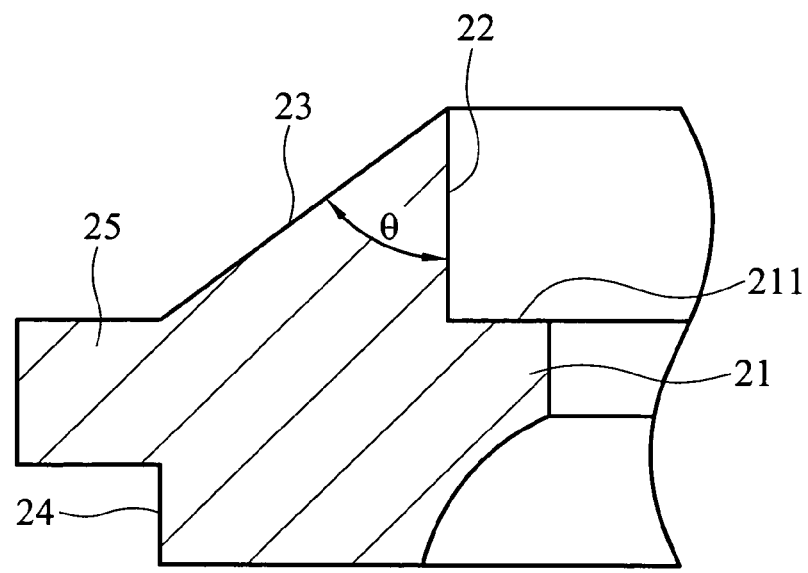
FIGS. 4A-4C show partial cross sections of several embodiments of support rings of the present invention.

FIG. 4A shows a partial cross sections of an embodiment of a support ring. In FIG. 4A, the flange 21 comprises a horizontal top surface 211 perpendicular to the inner bore 22 of the support ring 20. The end surface 23 is an annular flat surface inclined to the inner bore 22 by an acute angle θ between 25° and 85°. The intersection of the end surface 23 and the inner bore 22 is higher than the intersection of the end surface 23 and the outer bore 24 of the support ring 20. Particles P tend to accumulate at the depressed outer bore 24 adjacent to the sidewall of the seat 32. Thus, some embodiments of the pipe support 34 may potentially prevent accumulation of particles P between the inner pipe 38 and support ring 20. Thus, the possibility that particles P will enter the reaction chamber 382 through the gap g therebetween may be reduced.

Figure 4B:
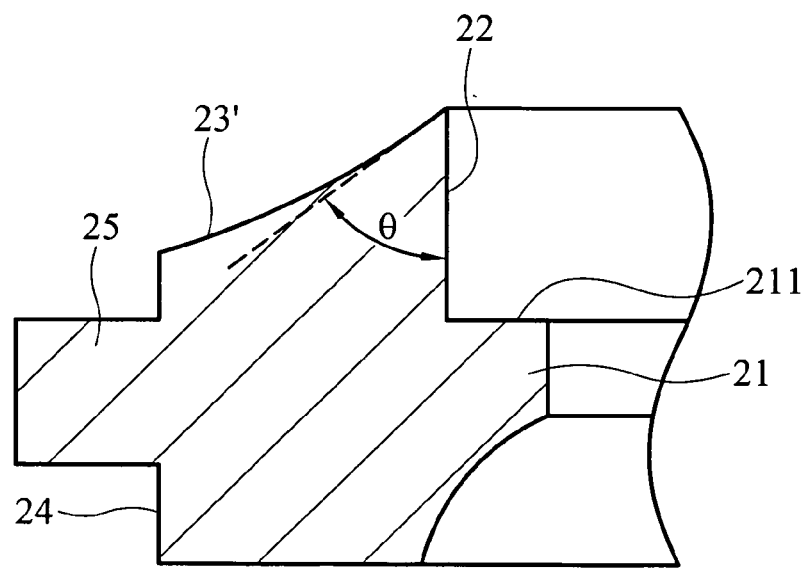
Figure 4C:
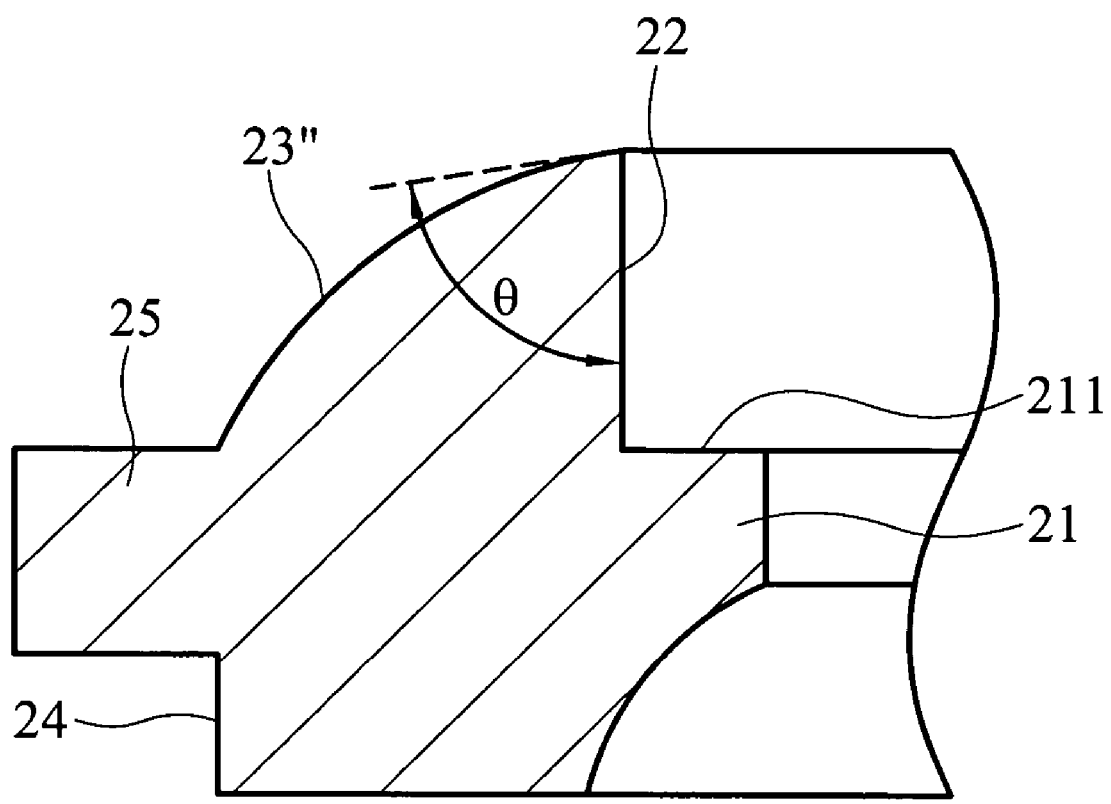

Moreover, the end surface of the support ring can also be an annular concave surface 23' as shown in FIG. 4B, or an annular convex surface 23" as shown in FIG. 4C. The tangents of the end surfaces 23' and 23" are individually inclined to the inner bore of the support ring 20 by an acute angle θ. The intersections of the end surfaces 23' and 23" and the inner bores 22 are also higher than the intersections of the end surfaces 23' and 23" and the outer bores 24 of each support ring 20. Thus potentially reducing the possibility that particles P will enter the reaction chamber through the gap therebetween.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pipe support for supporting an inner pipe and an outer pipe, comprising:
   a seat with a tubular portion supporting the outer pipe at a top end thereof; and
   a support ring detachably disposed within the tubular portion and having a flange and an end surface, wherein the flange is disposed on an inner bore of the support ring, supporting the inner pipe, the end surface is outwardly inclined from the inner bore to an outer bore of the support ring, and the end surface meets the inner bore at an acute angle.

2. The pipe support as claimed in claim 1, wherein the flange has a top surface perpendicular to the inner bore of the support ring.

3. The pipe support as claimed in claim 1, wherein the end surface is inclined to the inner bore by an angle between 25° end 85°.

4. The pipe support as claimed in claim 1, wherein the seat and the support ring are stainless steel.

5. A pipe support for supporting an inner pipe and an outer pipe, comprising:
   a seat with a tubular portion supporting the outer pipe at a top end thereof; and
   a support ring detachably disposed within the tubular portion and having an end surface and an inner bore, wherein the end surface meets the inner bore at an acute angle.

6. The pipe support as claimed in claim 5, wherein the support ring has a flange disposed on the inner bore, supporting the inner pipe.

7. The pipe support as claimed in claim 5, wherein the end surface is an annular concave surface.

8. The pipe support as claimed in claim 5, wherein the end surface is inclined to the inner bore by an acute angle between 25° and 85°.

9. The pipe support as claimed in claim 8, wherein the intersection of the end surface and the inner bore is higher than the intersection of the end surface and to outer bore of the support ring.

10. The pipe support as claimed in claim 9, wherein the end surface is an annular convex surface.

11. The pipe support as claimed in claim 5, wherein the seat and the support ring are stainless steel.

12. A semiconductor apparatus comprising:
    an outer pipe;
    an inner pipe; and
    a pipe support,
    wherein the pine support has a seat with a tubular portion for supporting an outer pipe at a top end thereof, and a support ring detachably disposed within the tubular portion, the support ring having an end surface and an inner bore, and the end surface meeting the inner bore at an acute angle.

13. The semiconductor apparatus as claimed in claim 12, wherein the support ring has a flange on the inner bore thereof.

14. The semiconductor apparatus as claimed in claim 13, wherein the flange has a top surface perpendicular to the inner bore.

15. The semiconductor apparatus as claimed in claim 12, wherein the end surface is outwardly inclined from the inner bore to an outer bore of the support ring.

16. The semiconductor apparatus as claimed in claim 12, wherein the end surface is an annular concave surface.

17. The semiconductor apparatus as claimed in claim 12, wherein the end surface is inclined to the inner bore surface by an acute angle between 25° and 85°.

18. The semiconductor apparatus as claimed in claim 17, wherein the intersection of the end surface and the inner bore is higher than the intersection of the end surface and an outer bore of the support ring.

19. The semiconductor apparatus as claimed in claim 18, wherein the end surface is an annular convex surface.

20. The semiconductor apparatus as claimed in claim 12, wherein the seat and the support ring are stainless steel.

* * * * *